United States Patent [19]

Moser

[11] 3,823,753

[45] July 16, 1974

[54] TREE HARVESTER WITH SUPPLEMENTAL GRAPPLE

[75] Inventor: Raymond L. Moser, Tremont, Ill.

[73] Assignee: Caterpillar Tractor Co., Peoria, Ill.

[22] Filed: Apr. 9, 1973

[21] Appl. No.: 348,928

[52] U.S. Cl............. 144/3 D, 83/600, 83/928, 144/2 Z, 144/34 R
[51] Int. Cl............................................. B27c 9/00
[58] Field of Search........ 144/2 Z, 3 D, 34 R, 34 B, 144/34 E, 34 A, 309 AC; 83/600, 928

[56] References Cited
UNITED STATES PATENTS

| | | |
|---|---|---|
| 3,461,928 | 8/1969 | Siiro.................................. 144/3 D |
| 3,575,222 | 4/1971 | Tucek................................ 144/34 R |
| 3,720,246 | 3/1973 | David................................. 144/3 D |
| 3,738,401 | 6/1973 | Wiklund et al........... 144/309 AC X |

Primary Examiner—Andrew R. Jukasz
Assistant Examiner—W. D. Bray
Attorney, Agent, or Firm—Phillips, Moore, Weissenberger Lempio & Strabala

[57] ABSTRACT

A tree harvester including a tree harvester assembly pivotably mounted on a vehicle with a grapple mechanism arranged on the harvester assembly for engaging a tree and raising it into a processing position by pivotable movement of the tree harvester assembly.

8 Claims, 3 Drawing Figures

TREE HARVESTER WITH SUPPLEMENTAL GRAPPLE

BACKGROUND OF THE INVENTION

The present invention relates to a tree harvester and more particularly to a tree harvester having a harvester assembly which is pivotably or rotatably mounted on a vehicle. A supplemental grapple is provided by the present invention to adapt such a tree harvester for processing cut or fallen trees. A tree harvester of the type contemplated by the present invention is described in U.S. Pat. No. 3,669,161, issued June 13, 1972 and assigned to the assignee of the present invention.

In conventional operation, the vehicular mounted harvester assembly may be moved into operating alignment with a tree with a drive means being engaged with the tree for propelling it through a processing implement such as a delimbing mechanism. The standing tree is then cut or severed by the shear and preferably rotated into a generally horizontal position with the drive means being actuated to propel or urge the tree through the delimbing mechanism. Within such a combination, it will be apparent that the implement contemplated by the present invention may also comprise the shear assembly with the shear assembly being used, for example, to cut the tree into selected lengths.

The components of such tree harvesters are relatively large and tend to prevent the harvester assembly from being moved into suitable alignment with a fallen tree. It is desirable to adapt the harvester assembly for the processing of fallen trees as well as standing trees in order to increase its operating versatility.

SUMMARY OF THE INVENTION

Accordingly, it is an object of the present invention to provide an auxiliary grapple upon a tree harvester assembly which is pivotably or rotatably mounted upon a vehicle. The grapple may be employed to engage a fallen or cut tree with the tree being brought into processing alignment with the harvester assembly by pivotable or rotatable motion of the harvester assembly itself.

DESCRIPTION OF A PREFERRED EMBODIMENT

Figure 1:
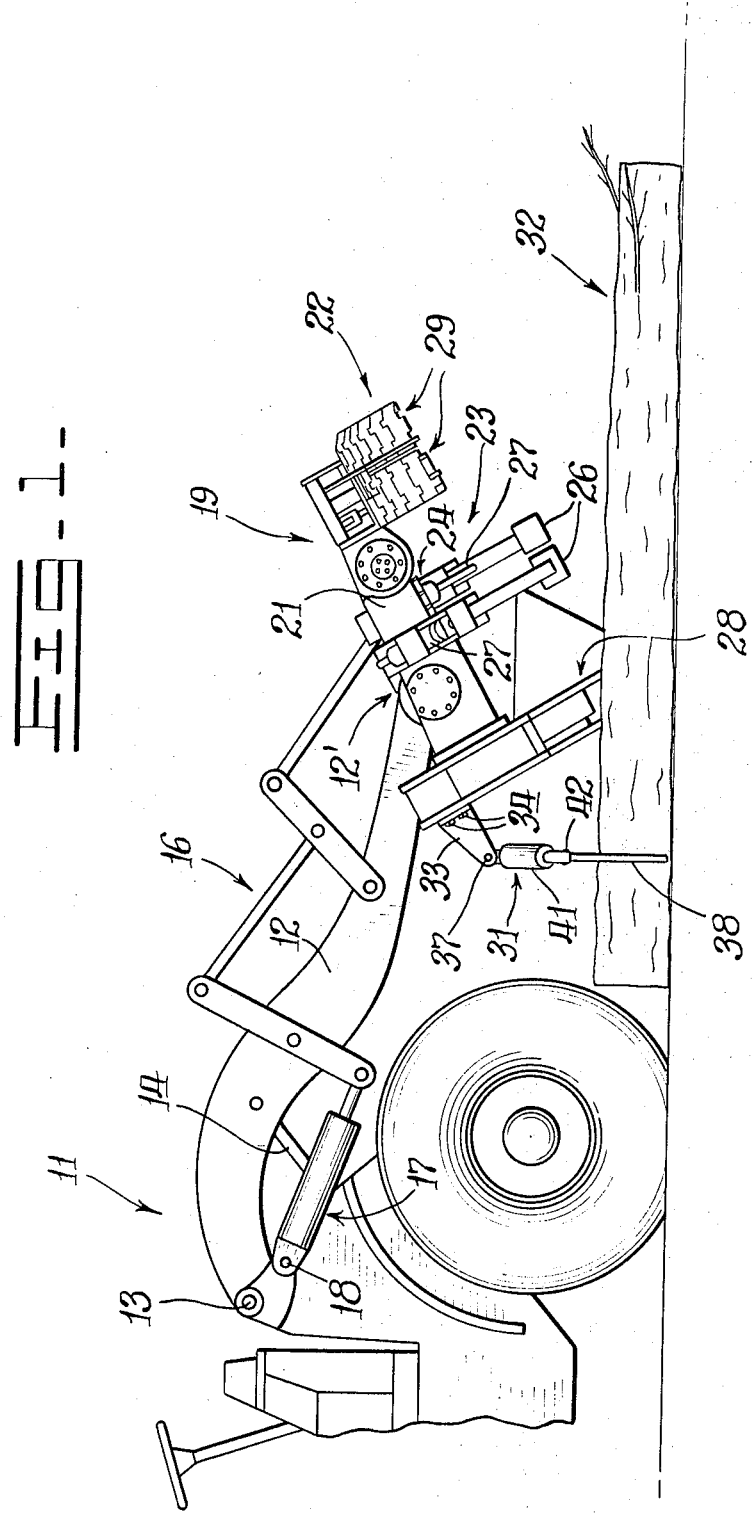
FIG. 1 is a side view in elevation of a tree harvester assembly and the forward end vehicle upon which the harvester assembly is pivotably or rotatably mounted.

The present invention contemplates an auxiliary grapple adapted for use with a tree harvester assembly which is pivotably or rotatably mounted on a vehicle. As illustrated in FIG. 1, the vehicle may be embodied as a loader of the type illustrated at 11. Such a vehicle includes a pair of lift arms, one of which is indicated at 12 as being pivotably supported upon the vehicle at 13. The lift arms are conventionally raised and lowered by means of respective hydraulic jacks, an extendable rod for one of the jacks being indicated at 14. A conventional tilt mechanism or linkage 16 is operated by one or more associated hydraulic jacks such as that which is indicated at 17 and pivotably secured to the vehicle at 18.

A tree harvester assembly is illustrated at 19, the harvester assembly being pivotably mounted upon the extending ends 12' of the lift arms and coupled to a portion of the tilt linkage 16 which is operable to pivot or rotate the harvester assembly upon the lift arms. The lift arms 12 may, of course, be positioned by the lift jacks 14, to raise and lower the harvester assembly 19.

Figure 2:
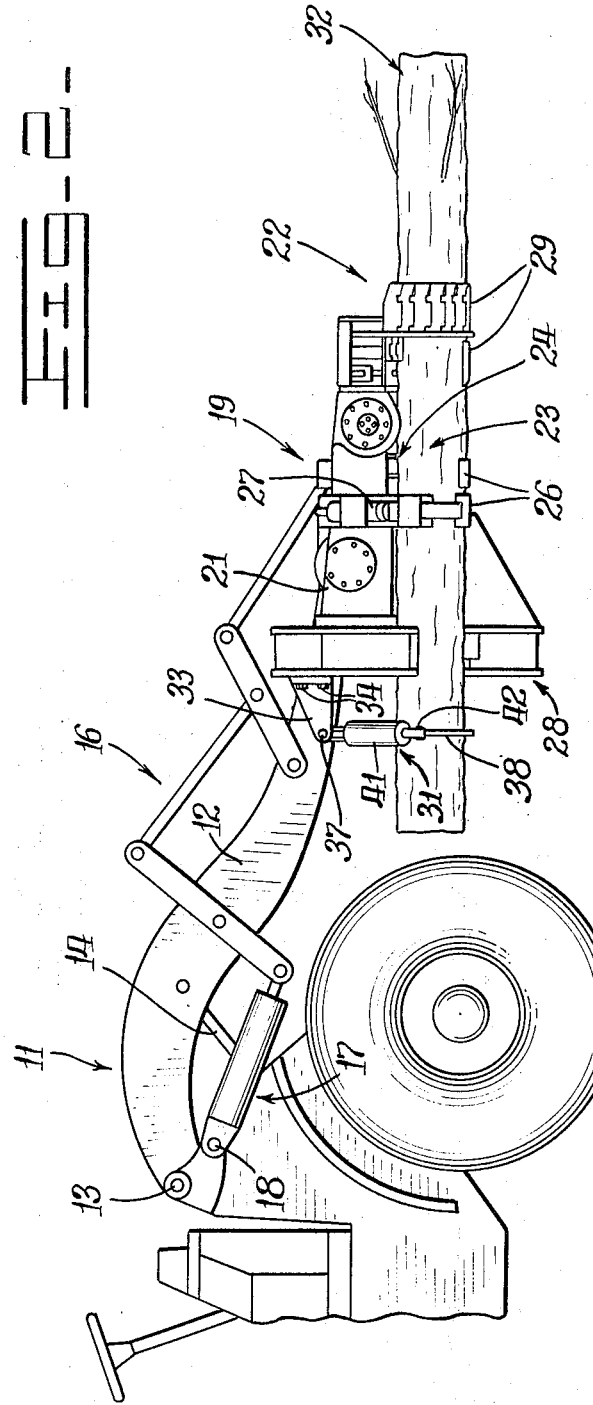
FIG. 2 is a view similar to FIG. 1 with the harvester assembly being rotated into a generally horizontal position for processing the tree.

The harvester assembly preferably includes an elongated frame 12 which is pivotably secured to the lift arms 12 and the tilt linkage 16. The harvester assembly includes a processing implement such as a delimbing assembly 22 arranged at one end of the frame 21. A drive mechanism 23 is arranged upon a central portion of the frame 21 in operating alignment with the delimbing assembly 22. A drive mechanism of the type contemplated by the present invention and illustrated in FIGS. 1 and 2 is shown in greater detail by the above referenced patent. The drive mechanism 23 comprises an endless drive track 24 arranged for rotation upon the frame 21 in operating alignment with the delimbing assembly 22. A pair of clamps 26 are pivotably mounted upon the frame 21, the clamps being operable by hydraulic jacks 27 into a position as shown in FIG. 1 where they provide an opening for receiving a tree against the drive track 24. The clamps may then be rotated toward each other to secure the tree in processing alignment with both the endless track 24 of the drive means and with the delimbing assembly 22.

The harvester assembly also includes a shear mechanism 28 arranged at an opposite end of the frame 21 from the delimbing assembly 22.

In normal operation, the frame 21 is arranged in generally vertical fashion and positioned to receive a standing tree within a processing path formed by the drive mechanism 23 and the delimbing assembly 22. The clamps 26 are then rotated to secure the tree against the endless track 24 and flexible blades 29 in the delimber assembly 22 are brought into engagement with the circumference of a tree as the tree is propelled therethrough by the drive mechanism 23. After the tree is engaged by the clamps 26 and the flexible blades, it is severed by the shear assembly 28. The harvester assembly is then rotated into a generally horizontal position as illustrated, for example, in FIG. 2 and the tree is urged through the delimbing assembly 22 by the drive means 23 to remove its limbs. The shear assembly 28 may also be employed during movement of the tree through the harvester assembly in order to cut the tree into sections of selected lengths.

It is apparent particularly from reference to FIG. 1 that a fallen or cut tree cannot be readily grasped in processing alignment by the harvester assembly 19 because of the construction of the shear assembly 28 and the extended length of the clamps 26. Accordingly, an auxiliary grapple is provided as contemplated by the present invention to adapt the harvester assembly for moving cut or fallen trees into processing alignment within the harvesting assembly by pivotable or rotatable motion of the harvester assembly itself upon the vehicle.

An auxiliary grapple of this type is indicated at 31 for adapting the tree harvester assembly 19 to process fallen or previously cut trees such as that indicated at 32. As best seen in FIGS. 1 and 2, the auxiliary grapple assembly 31 is preferably mounted upon an elongated bracket 33 secured to one end of the frame 21 or to the harvester assembly 28 itself as shown in FIGS. 1 and 2. The bracket 33 is secured to the harvester assembly by bolts 34 so that the entire auxiliary grapple assembly 31 and the bracket 33 may be readily removed to adapt the harvester assembly for the processing of standing trees. It is desirable that the grapple assembly be removable from the harvester assembly so that the shear assembly 28 may be lowered into close proximity with the ground when the harvester is processing standing trees.

Figure 3:
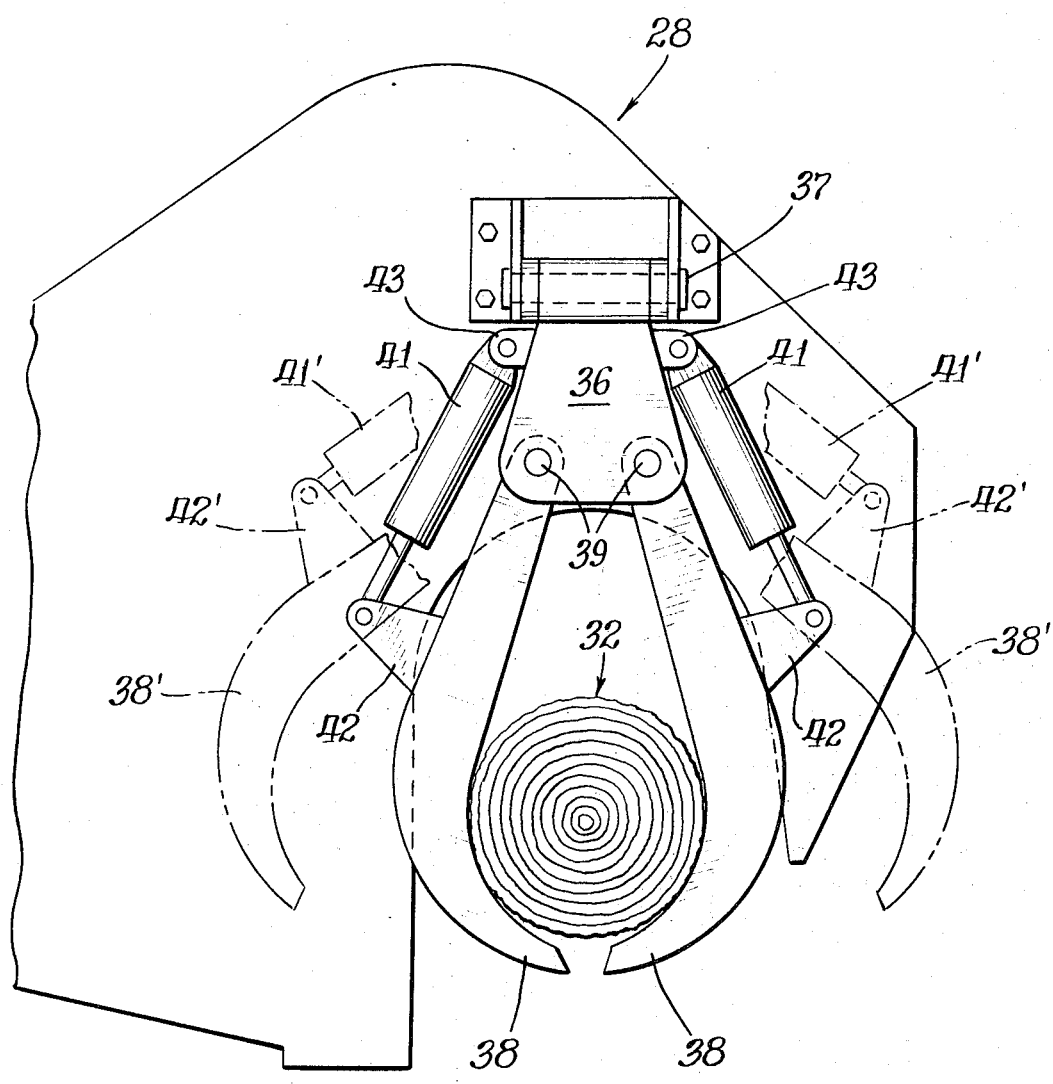
FIG. 3 is a fragmentary view taken from the left end of the harvester assembly as seen in FIG. 2 in order to more clearly illustrate the manner in which the auxiliary grapple is arranged upon the harvester assembly.

Construction of the grapple assembly 31 itself may be more clearly seen having reference particularly to FIG. 3. As shown in FIG. 3, the bracket 33 is of bifurcated construction with a base plate 36 of the grapple assembly being pivotably mounted upon the bracket 33 by means of a pivot pin 37. Thus, the entire grapple assembly 31 is suspended in generally vertical relation from the bracket 33. A pair of grapple arms 38 are pivoted to the base plate 36 at 39 while being curved at their outer ends for encircling and securing the tree 32. The grapple arms 38 are controlled by respective hydraulic jacks 41 which are pivotably interconnected between brackets 42 on the grapple arms 38 and additional brackets 43 secured to the base plate 36. The solid line representation of the grapple assembly in FIG. 3 shows the hydraulic jacks 41 in an extended condition with the grapple arms 38 beiing urged toward each other to engage the tree 32. Portions of the grapple assembly 31 are also shown in phantom with the jacks being retracted to urge the grapple arms apart for releasing or receiving the tree 32. The grapple assembly components shown in phantom are illustrated by similar primed numerals.

A preferred manner of operating the tree harvester with the auxiliary grapple 31 is described below with particular reference to FIGS. 1 and 2. In order to move a fallen tree 32 into processing alignment with various components of the tree harvester assembly 19, the harvester assembly is rotated into an angular position as illustrated in FIG. 1 so that the grapple arms 38 extend substantially below the shear assembly 28 and other components of the harvester assembly 19. The grapple arms 38 are then in an open condition with the jacks 41 being retracted. When the grapple assembly is in proper alignment with the fallen tree 32 as illustrated in FIG. 1, the jacks 41 are extended in order to engage or secure the grapple arms 38 about the tree 32. The harvester assembly 19 is then rotated upon the lift arms 12 by the tilt mechanism 16 into a generally horizontal position as illustrated in FIG. 2. As the harvester assembly is rotated in this manner, the freely pivotable grapple assembly 31 raises one end of the tree 32 until it is in processing alignment with the drive means 23 and the delimbing assembly 22 as well as the shear assembly 28. The clamps 26 may then be closed in the same manner described above to secure the tree against the endless drive track 24. The flexible blades 29 of the delimbing assembly 22 are also brought into engagement with the circumference of the tree. The tree may then be processed in the normal manner with the drive means moving the tree in a leftward direction as viewed in FIG. 2 so that the delimbing assembly removes any limbs or projections as the tree 32 passes therethrough. The shear assembly 28 may, of course, be employed during this mode of operation if desired to cut the tree into sections of desired length.

Once the tree is secured by the clamps 26 in processing alignment within the harvester assembly 19, the grapple arms are, of course, released from the tree so that the tree is free to move to the left as viewed in the drawings while it is being processed.

In the claims:

1. A vehicular mounted tree harvester adapted to process trees lying on the ground comprising a vehicle, a tree harvester assembly pivotably mounted upon the vehicle and having a tree processing implement and drive means providing a processing path for trees arranged perpendicularly to an axis of the pivotable mounting for the tree harvester assembly on the vehicle, the drive means being operable to propel the tree through the implement, means for pivoting the tree harvester assembly relative to the vehicle, and a grapple mechanism arranged on the harvester assembly in alignment with the implement and drive means and in spaced apart relationship therefrom along the processing path in order to engage a tree lying on the ground and raise the tree into the processing path by pivotable motion of the tree harvester assembly.

2. The tree harvester of claim 1 wherein the tree processing implement is a delimbing assembly and the drive means comprises an endless track and movable clamps for urging the tree into engagement with the endless track.

3. The tree harvester of claim 1 wherein the tree processing implement is a delimbing assembly, the drive means further comprising means for maintaining the tree within the processing path, a shear assembly being mounted upon the tree harvester assembly in alignment with the drive means and the delimbing assembly, the drive means being arranged between the shear assembly and the delimbing assembly.

4. The tree harvester of claim 3 wherein the grapple mechanism is pivotably secured to one end of a tree harvester assembly adjacent the shear assembly.

5. The tree harvester of claim 4 comprising means for replaceably securing the grapple mechanism to the tree harvester assembly.

6. The tree harvester of claim 4 wherein the grapple mechanim comprises a pair of grapple arms with hydraulic jack means being operatively coupled with the grapple arm to urge them into engagement with a tree.

7. The tree harvester of claim 1 wherein the grapple mechanism comprises a pair of grapple arms and hydraulic jack means operatively coupled with the grapple arms, the grapple mechanism being pivotably secured to one end of the tree harvester assembly.

8. A vehicular mounted tree harvester adapted to process cut trees lying on the ground and comprising a vehicle having a pivotable lift arm extending from one end thereof and an associated tilt mechanism, a tree harvester assembly including an elongated frame pivotably secured to the lift arm and the tilt mechanism, a drive and clamp means being arranged upon a central portion of the elongated frame, a delimbing assembly being arranged on an upper end of the elongated frame when the frame is vertically positioned, a shear assembly being arranged upon the other end of the elongated frame, the delimbing assembly and shear assembly both being in operating alignment with the drive and clamp means, and an auxiliary grapple assembly supported upon the tree harvester assembly by an elongated bracket adjacent the shear assembly, the grapple assembly including a base plate pivotably mounted upon the elongated bracket and grapple arms pivotably secured to the base plate with jack means being effectively coupled between the grapple arms and base plate for opening and closing the grapple arms.

* * * * *